Jan. 25, 1955

B. J. BROWN 2,700,541

ADJUSTABLE LEVER AND SPRING SUSPENSION
SYSTEM FOR AUTOMOBILES

Filed July 10, 1952

INVENTOR.
Burton J. Brown.
BY
Stanley Lightfoot
Attorney

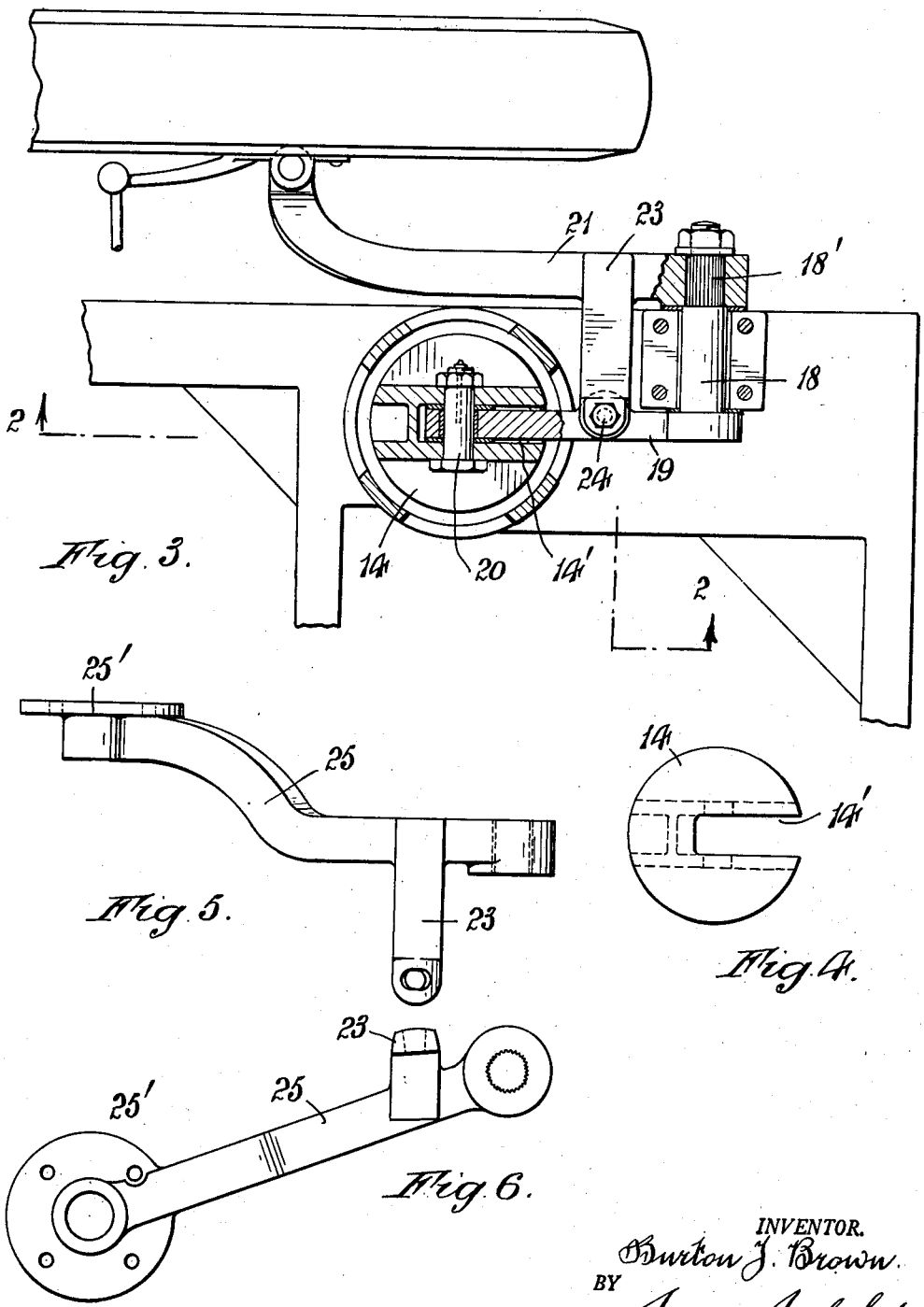

United States Patent Office 2,700,541
Patented Jan. 25, 1955

2,700,541

ADJUSTABLE LEVER AND SPRING SUSPENSION SYSTEM FOR AUTOMOBILES

Burton J. Brown, Saginaw, Mich.

Application July 10, 1952, Serial No. 298,020

3 Claims. (Cl. 267—20)

This invention relates to spring suspension for vehicles such as automobiles and has for its object to provide an arrangement of springs and levers for supporting the vehicle frame and parts carried thereby through individual suspension means for each of both front and rear wheels; and to provide means whereby the normal height of the vehicle frame as related to the wheel axes may be varied to determine the road clearance according to a necessity or desire.

The invention still further contemplates the provision of means for varying the effective resistance and reaction of the suspension springs to meet variations of vehicle weight or to vary the spring action of the suspension.

The said invention is further intended to meet conditions imposed by the incorporation of individual driving motors within the wheel structures as a part thereof; and to provide a type of suspension which will lend itself to smooth and efficient operation notwithstanding the concentration of motor weight within the wheels where such an arrangement may be resorted to.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:

Figure 3 is a sectional plan view of the same taken on a plane indicated by line 3—3 in Figure 2;

Figure 4 is a plan view of the spring spacer employed in the arrangement of Figures 1, 2, and 3;

Figure 5 is a top plan view of a somewhat modified form of wheel mounting arm from that shown in Figures 1, 2, and 3 for the purpose of use in connection with the rear wheels of the vehicle; and Figure 6 is a side elevation of the said rear wheel mounting arm.

Similar characters of reference indicate similar parts of the several figures of the drawing.

Figure 1:
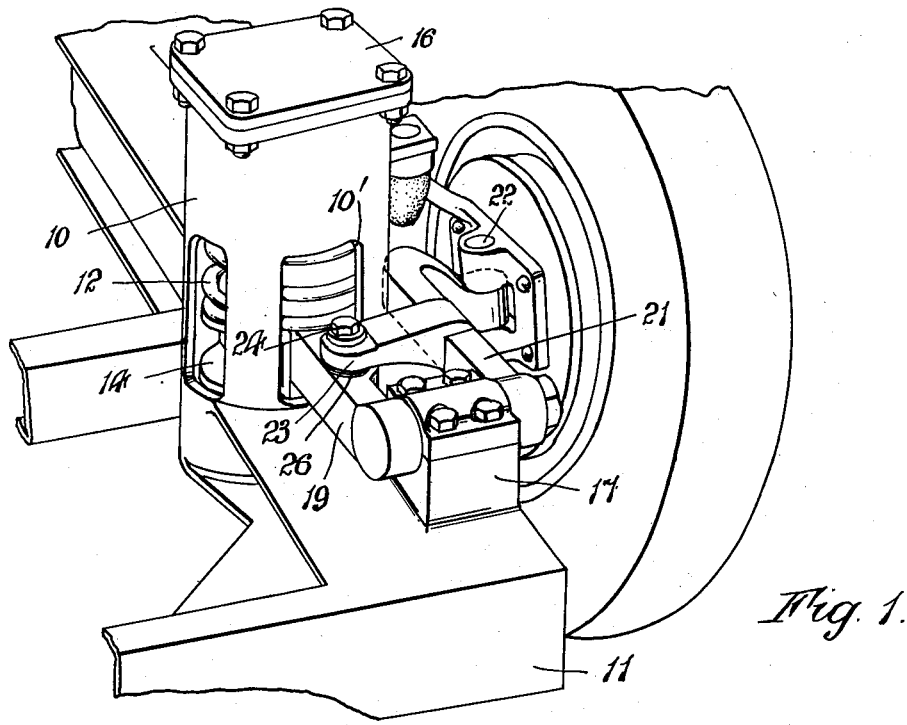
Figure 1 is a perspective view of a front wheel suspension embodying the said invention.
Figure 2:
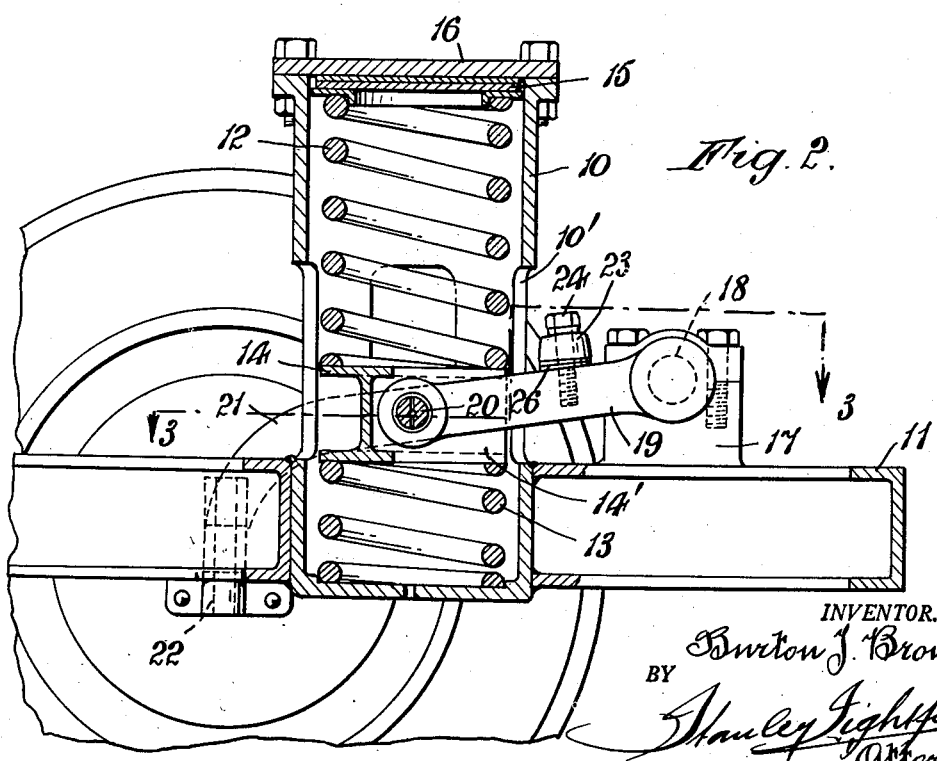
Figure 2 is a sectional view of the same taken on a plane indicated by the line 2—2 in Figure 3.

As best seen from an examination of Figure 2 of the drawings, a cylindrical spring housing 10 is shown as being built into the vehicle frame 11 and enclosing upper and lower coiled compression springs, 12 and 13, between which is a spring spacer 14 such as of the type shown in plan of Figure 4.

Suitable means, such as replaceable shims 15 which may be inserted in desired number and thickness between the upper spring 12 and the lower face of a closure cap 16 at the top of the housing 10, may be provided for varying the initial compression of the said springs 12 and 13. Of course, regardless of such means, one or other or both of the said springs may be replaced by heavier or lighter springs as requirements may dictate in order to secure the desired characteristics of support and resilience which the particular nature, weight or use of the vehicle may call for.

Mounted on the frame 11 forwardly of the said spring housing 10 is a pillow block 17 in which is journalled the pivot pin 18 of a lever arm 19 which lever arm extends rearwardly of the said pillow block through an opening 10' in the wall of the spring housing 10 and has its free end entering a slot 14' in the said spring spacer 14 to which it is secured by the wrist pin 20. Thus, the said arm 19 may swing vertically about its pivot subject to resistance by the said upper and lower springs 12 and 13.

The pivot pin 18 has its opposite end extended beyond the pillow block in the form of a splined extension 18' which has mounted thereon the correspondingly splined end of a wheel mounting arm 21. The free rear end portion of this arm 21 is bent downwardly and outwardly away from the frame in a suitable manner to engage with the king pin 22 of the vehicle wheel, as in the manner well-known.

23 indicates a bridging arm, extending from the wheel supporting arm 21 over the lever 19 and secured thereto by the bolt 24 to provide for the mutual support, one from the other, of the said lever 19 and arm 21 and assure mutual rigidity of their assembly with respect to the pivot pin 18, whereby vertical motions of the said arm 21 will be effectively transmitted to the lever 19 and imposed on the springs 12 and 13 according to the direction of such motion. Likewise reaction of the said springs will be imposed on the arm 21.

An arrangement such as that described is intended to be applied to each of the four wheels individually of the vehicle with the exception that, there being no steering mechanism or king pin provided in connection with the rear wheels, a modified form of wheel mounting arm 25 such as that illustrated in Figures 5 and 6 may be substituted for the arm 21 with its rear free end provided with a suitable boss or plate 25' to be attached to the bearing or mechanism about which the said rear wheel is mounted.

A feature of the suspension means described is, that not only may the characteristics of the spring suspension itself be varied and regulated relative to the normal height of the axes of the wheels, but it may be varied to regulate the normal clearance of the frame from the roadway, either with regard to the normal weight or load of the vehicle or with regard to variations in load from time to time; and for this purpose means are provided for regulating the relative vertical angularity, with respect to one another, of the lever 19 and the arm 21 (or 25 as the case may be) so that the said lever and the arm may both lie in a substantially common horizontal plane as shown in Figure 2, or the said arm may be angled upwardly or downwardly from that plane thereby lowering or raising the normal position of the frame 11 with respect to the wheel axes.

In this example, this adjustment may be effected by removing the arm 21 from its splined engagement with the outer end of the pivot pin 18 and then re-assembling it thereon in a differently rotated engagement upwardly or downwardly with the said splines as will be readily understood; and, to provide for this adjustment, I have shown a series of shims 26 interposed between the bridging arm 23 and the lever 19 which shims may be increased or decreased in thickness or in number, or altogether eliminated, to agree with the variation in adjustment of the arm 21 with respect to the lever 19 and at the same time to provide for the rigid clamping of the bridging arm to the said lever 19 in all such positions of adjustment.

This arm 19 relieves the splined connection of the arm 21 and the pivot 18 from undue strain, in addition to providing for rigidity in the assembly and effective transmittal of forces between the two members 19 and 21.

The arrangement described lends itself very well to use in vehicles wherein a motor mechanism is housed in the wheel structures (usually electric or hydraulic power motors within the structure of the rear wheels). The variable pre-loading of the spring suspension together with the ability to vary the height of the vehicle frame in combination with this pre-loading, provides for ready adaptation of the suspension system to a great variety of conditions under which the vehicle may be required to operate.

This invention may be developed within the scope of the following claims without departing from the essential features of the said invention, and it is desired that the specification and drawing be read as being merely illustrative of a practical embodiment of the same and not in strictly limiting sense.

What I claim is:

1. In an automobile suspension system, in combination, a frame, a load-carrying spring mounted on said frame, a rebound spring, a spacer between said springs, a lever pivoted on said frame with its free end coupled to said spacer, an arm secured to and pivotally movable with said lever, said arm and lever being vertically swingable to relative variable angles to one another, means for securing said arm and lever in positions of relative angular adjustment, and adjustable bracing bridge member connecting said arm and lever in positions of angular adjustment, and means at the free end of said arm for the mounting of a wheel axle thereon.

2. In an automobile suspension system, a frame, a load-carrying spring mounted on said frame, a rebound spring, a spacer between said springs, a shaft pivotally mounted on said frame spaced from said springs, a lever having one end thereof rigidly secured to said shaft and the other end thereof coupled to said spacer; a splined portion on said shaft, an arm having a mating splined bore releasably fastened over said shaft splined portion, an adjustable bracing bridge member rigidly connecting said arm and lever at a point remote from said pivotably mounted shaft, and means at the free end of said arm for the mounting of a wheel axle thereon.

3. In an automobile suspension system, the combination of a frame, a load-carrying spring mounted on said frame, a rebound spring, a spacer between said springs, a shaft pivotably mounted on said frame at a point spaced from said springs, a lever having one end thereof rigidly secured to said shaft and the other end thereof coupled to said spacer; an arm adjustably fastened to said shaft whereby said lever and arm pivot together, but where the angular relationship between said arm and lever may be changed, means at the free end of said arm for the mounting of a wheel axle thereon, said suspension system including a bracing bridge member rigidly connecting said arm and lever at a point remote from said shaft, and means for adjusting said bridge member when the angular relationship between said arm and lever are changed.

References Cited in the file of this patent

UNITED STATES PATENTS

| 1,105,971 | Fox | Aug. 4, 1914 |
| 1,290,293 | Morski | Jan. 7, 1919 |
| 1,641,567 | Barling | Sept. 6, 1927 |
| 1,752,694 | Recchia | Apr. 1, 1930 |
| 2,052,309 | Kovach | Aug. 25, 1936 |
| 2,165,460 | Desing | July 11, 1939 |

FOREIGN PATENTS

| 359,466 | Great Britain | Apr. 15, 1930 |